(12) United States Patent
Kim et al.

(10) Patent No.: US 6,917,218 B2
(45) Date of Patent: Jul. 12, 2005

(54) SERIAL FINITE FIELD MULTIPLIER

(75) Inventors: Won Jong Kim, Daejon-Shi (KR);
Seung Chul Kim, Daejon-Shi (KR);
Han Jin Cho, Daejon-Shi (KR);
Kwang Youb Lee, Seoul (KR)

(73) Assignee: Electronics and Telecommunications Research Institute (KR)

( * ) Notice: Subject to any disclaimer, the term of this patent is extended or adjusted under 35 U.S.C. 154(b) by 94 days.

(21) Appl. No.: 10/683,228

(22) Filed: Oct. 10, 2003

(65) Prior Publication Data

US 2004/0107233 A1 Jun. 3, 2004

(30) Foreign Application Priority Data

Dec. 3, 2002 (KR) ................................ 10-2002-0076202

(51) Int. Cl.[7] ........................................... H03K 19/173
(52) U.S. Cl. ......................... 326/38; 326/46; 708/492; 708/625
(58) Field of Search ........................... 326/37, 38, 46; 708/491, 492, 625

(56) References Cited

U.S. PATENT DOCUMENTS

| | | |
|---|---|---|
| 4,797,848 A | 1/1989 | Walby |
| 5,999,959 A | 12/1999 | Weng et al. |
| 6,178,436 B1 * | 1/2001 | Blake et al. ................. 708/492 |

FOREIGN PATENT DOCUMENTS

| | | |
|---|---|---|
| EP | 0741355 | 3/1998 |
| JP | 08-221256 | 8/1996 |
| KR | 101900006666 | 9/1990 |
| KR | 10-0218825 | 6/1999 |
| KR | 1020010107087 | 12/2001 |

OTHER PUBLICATIONS

IEEE Transaction on Consumer Electronics, vol. 47, No. 3, Aug. 2001.

* cited by examiner

*Primary Examiner*—Anh Q. Tran
(74) *Attorney, Agent, or Firm*—Blakely Sokoloff Taylor & Zafman

(57) ABSTRACT

The present invention relates to a finite field multiplier used for implementing an encrypting algorithm circuit, thereby minimizing power consumption and circuit area in implementing the finite field multiplier with a LFSR (Linear Feedback Shift Register) structure. The Finite field multiplier of the present invention is an operator performing a modular operation on the multiplication result of two data represented on a polynomial basis in a Galois Field into an irreducible polynomial. The LFSR structure is a serial finite field multiplication structure, and has a merit over an array structure and a hybrid structure in application to systems that are limited in size and power due to its simplicity of circuits and also its capability of being implemented in a small size.

8 Claims, 4 Drawing Sheets

SERIAL FINITE FIELD MULTIPLIER

BACKGROUND OF THE INVENTION

1. Field of the Invention

The present invention relates to a finite field multiplier used for implementing encrypting algorithm circuit, and more specifically, to a serial finite field multiplier for minimizing circuit power consumption and circuit area.

2. Description of the Prior Art

Portable type terminals such as a smart card and a smart phone comprise a microprocessor, an encrypting circuit, a memory, and input/output control circuits, etc. Since these portable type terminals have internationally standardized specifications for seamless interfaces with card reader systems, the terminals must be implemented with a minimum area in a limited space. Consequently, an encrypting circuit for implementing cryptography must be designed for low power consumption as well as small area.

An encrypting circuit such an elliptic curve cryptographic processor is implemented with multipliers, dividers, adders, and square operators on a finite field. The multipliers are used as the most basic operator among these operators. An operational equation in a finite field operation can be represented as a standard base, a normal base, or a dual base. Generally, the standard base representation is widely used because of its easy implementation. The polynomial base representation belongs to the standard base representation. A structure of a general multiplier on a polynomial base finite field is implemented with a bit-serial method or an array method. The array method can operate in a high speed, but it requires large hardware area for its implementation. As a result, a portable information terminal employs a structure according to the bit-serial method.

Ideas on the smart card and public-key cryptography have been around for 20 years. However, only a few years ago could the smart card employ the public-key cryptography by lack of method of implementing a public-key cryptography circuit suitable for IC (integrated circuit) cards. Recently, cryptographies such as RSA, US Digital Signature Standard, Russign Gost 34.10 have been frequently applied to the IC cards.

For the first time, W. Diffie and M. E. Hellman disclosed a concept of public-key cryptography suitable for a smart card in "New Directions in Cryptography" in 1976. Afterwards, the RSA cryptography which is based on the difficulty of factoring numbers was introduced in 1978 and has been still widely used. However, the RSA cryptography has a trend of extending over 1024 bits in order to increase its encryption strength, and has many difficulties in being mounted in a limited area such as smart cards. In 1987, Koblitz and Miller applied an ECC (Elliptic Curve Cryptography) algorithm to the public-key cryptography. Recently, the ECC algorithm has been used for implementing cryptography of the IC card such as smart cards because of its higher encryption strength with small bits.

Cryptographic processor employing the ECC algorithm comprises a finite field multipliers, dividers, adders and square operators. The multipliers play the most major role since the dividers and the square operators can be implemented with the multipliers. The finite field multipliers can be implemented in various ways. Typically, a serial multiplication structure such as an LFSR (Linear Feedback Shift Register) structure and a parallel multiplication structure such as a Systolic array structure are widely used for the finite field multipliers. Even though the LFSR structure has a slower multiplication speed than a parallel multiplication, the LFSR structure has wide usage because of its easy circuit implementation and capability of being implemented in small area.

The LFSR structure multiplier has been improved in various ways based on the method proposed by Edoardo D. Mastrovito. For example, a method has been proposed to overcome the shortcomings of slow operation speed of the serial multiplication of the LFSR structure. However, the proposed method has shortcomings of an increased circuit area because of its additional usage of t×m registers in order to achieve t times speed improvement.

Conventional finite field multipliers having LFSR structure comprise shift registers for storing the first input value, shift registers for storing the second input value, a plurality of logic gates for performing logic AND operations on the fist input value and the second input value, and registers for generating the multiplication result by adding the output value of each logic gate to the value of each bit and for storing the multiplication result.

The shift registers for storing the first input value and the second input value are implemented with flip-flops 1 to 3 as shown in FIG. 1. The flip-flops for each bit simultaneously perform shift operations in synchronization with each other in accordance with the main clock. Also, each of the registers for storing the multiplication results comprises flip-flop 6 as shown in FIG. 2.

Each of the flip-flops 1, 2, 3, 6 for each bit comprises first and second latches 4 and 5 as shown in FIG. 3, and transfers an input value to an output terminal at the clock edge. Each of the first and second latches 4 and 5 comprises a transistor Q1 for receiving an input value in accordance with the clock, and inverters I1 and I2 for latching an input value through a transistor Q2 operated by the clock.

A multiplication circuit having the aforementioned LFSR structure comprises a shift register having a shift function, AND gate, and XOR gate. The shift register comprises flip-flops synchronized at the edge of a clock. When the length of the multiplication data is m bits, 3×m flip-flops are needed in order to store the multiplication results. Since a single flip-flop comprises two latches, a total of 6×m latches are needed. Also, m AND gates and m+k XOR gates are needed, where k is the number of coefficients of 1 in an irreducible polynomial, that is, the number of feedback bits.

Registers constructed as above take up more than 60% of the total area and power consumption in a finite field multiplication circuit. Since flip-flops require twice as much area and power consumption as latches, there is a limitation in minimizing area and power consumption of a finite field multiplier under a restricted condition.

SUMMARY OF THE INVENTION

The object of the present invention is to provide a serial finite field multiplier to overcome the aforementioned problems by constructing registers with latches and controlling clock and data shift sequence.

To achieve the object, a serial finite field multiplier according to the present invention is characterized in that the serial finite field multiplier comprises a first shift register for shifting a first input value of m bits to right by one bit in accordance with the first to third clocks; a second shift register for shifting a second input value of m bits to right by one bit in accordance with the first to third clocks; and m logic gates for performing logic AND operation on the first input value and the second input value for each bit; and a m-bit register for generating a multiplication result by adding the output value of each of the logic gates to the value of each bit and for storing the multiplication result.

In addition, the serial finite field multiplier according to the present invention is characterized in that the first shift register comprises a plurality of registers for storing each bit of the first input value and shifting the stored value in accordance with the first to third clocks, and a plurality of adders connected to each of the registers for adding a feedback output value of the register to the output values of the previous registers in accordance with a coefficient of an irreducible polynomial, wherein odd numbered one of the registers comprises one latch and even numbered one of the registers comprises first and second latches, and wherein the stored value of the register is shifted through a step that data stored in the first latch of the even numbered register is transferred to the second latch in accordance with the first clock, a step that data stored in the latch of the odd numbered register is transferred to the first latch of the even numbered register in accordance with the second clock, and a step that data stored in the second latch of the even numbered register is transferred to the odd numbered register in accordance with the third clock.

In addition, the serial finite field multiplier according to the present invention is characterized in that the second shift register comprises a plurality of registers for storing each bit value of the second input value and shifting the stored value in accordance with the first to third clocks, wherein odd numbered one of the registers comprises one latch and even numbered one of the registers comprises first and second latches and wherein the stored value of the register is shifted through a step that data stored in the first latch of the even numbered register is transferred to the second latch in accordance with the first clock, a step that data stored in the latch of the odd numbered register is transferred to the first latch of the even numbered register in accordance with the second clock, and a step that data stored in the second latch of the even numbered register is transferred to the odd numbered register in accordance with the third clock.

In addition, the serial finite field multiplier according to the present invention is characterized in that each of the m-bit registers for generating and storing the multiplication results comprises latches and each of the latches receives the input value in accordance with the first clock.

In addition, the serial finite field multiplier according to the present invention is characterized in that the first to third clocks are sequentially generated during one cycle.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Bit-serial structure multiplier is usually designed with the LFSR structure. If the LFSR structure is used, it is possible to further reduce the number of gates than an array method, although the delay time increases in proportional to the encryption bits.

The present invention improves the LFSR structure and implements a finite field multiplier with a new structure having more efficient circuit area and power consumption than a conventional LFSR structure.

The present invention has an advantage on a circuit implementation of elliptic curve cryptography among public-key cryptographies recently widely used for portable type information terminal devices such as smart card, etc.

Overall circuit size and power consumption can be significantly reduced if the registers of a finite field multiplier are implemented with latches instead of flip-flops. But if shift registers are constructed with latches, data lacing occurs since the latch transfers an input value to an output terminal in accordance with clock levels. Therefore, one bit shifting operation cannot be performed at each clock unlike flip-flops. However, the present invention solves the lacing problem of the latch by controlling clock and data shift sequence, and allows a finite field multiplier with the LFSR structure to be implemented with the only latches without using the flip-flops.

Figure 4:
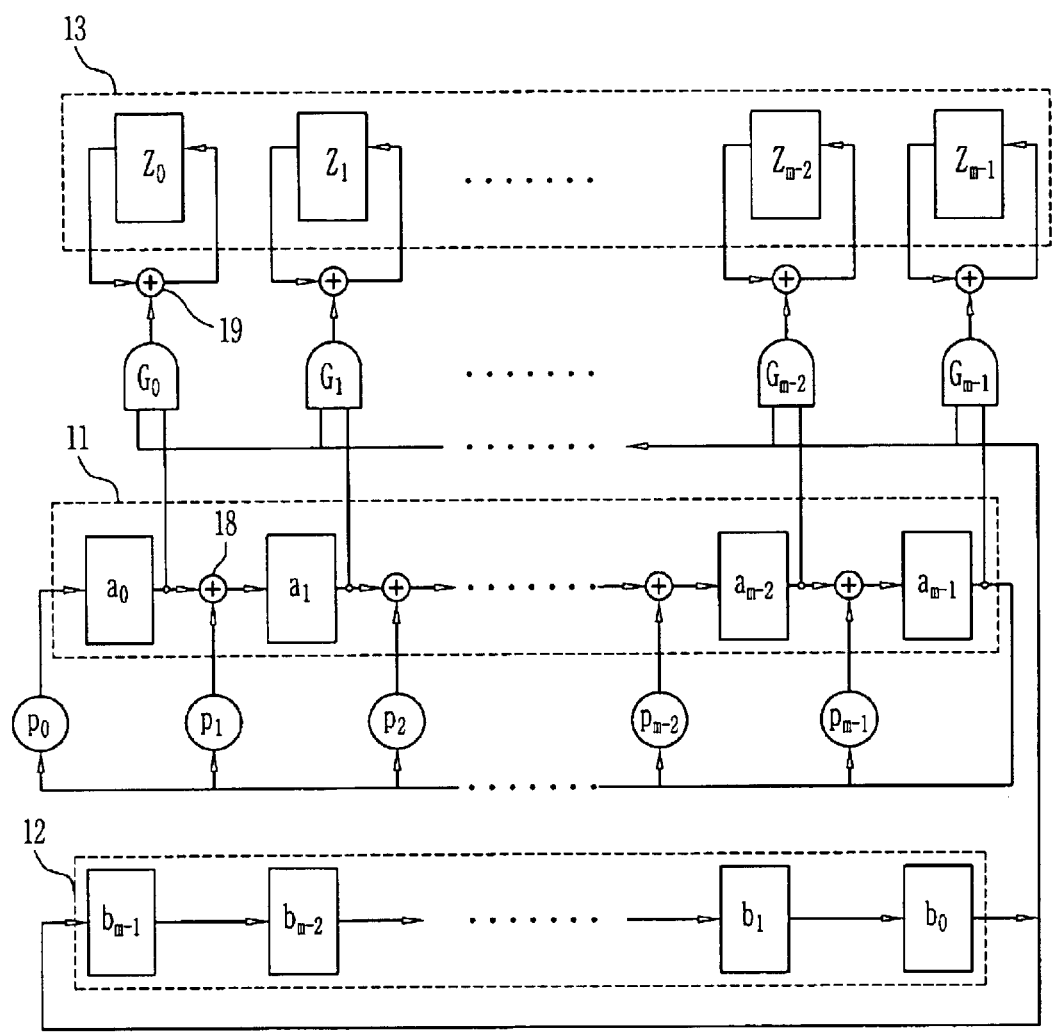
FIG. 4 is a view illustrating a structure of a finite field multiplier according to the present invention.

FIG. 4 is a view illustrating a structure of the serial finite field multiplier with the LFSR structure according to the present invention. In the serial finite field multiplier, the first and second input values a and b of m bits are multiplied, and then a modular operation is performed on the multiplication result by the coefficient p of an irreducible polynomial, thereby generating an m-bit output z.

The first shift register 11 transfers the first input value a of m bits to right by one bit in accordance with the first to third clocks CLK 1 to CLK 3. The first shift register 11 comprises a plurality of registers $a_0$ to $a_{m-1}$ for storing each bit of the first input value a and shifting the stored value in accordance with the first to third clocks CLK 1 to CLK 3, and a plurality of adders 18 connected to each of the registers $a_0$ to $a_{m-1}$, respectively, for adding the feedback output values of the registers to the output values of the previous registers in accordance with the coefficients $p_0$ to $p_{m-1}$ of an irreducible polynomial. Each of the odd numbered registers $a_0, a_2, a_4, \ldots$ comprises one latch, and each of the even numbered registers $a_1, a_3, a_5, \ldots$ comprises two latches.

The second shift register 12 transfers the second input value b of m bits to right by one bit in accordance with the first to third clocks CLK 1 to CLK 3. The second shift register 12 comprises a plurality of registers $b_0$ to $b_{m-1}$ for storing each bit of the second input value b and shifting the stored value in accordance with the first to third clocks CLK 1 to CLK3. Each of the odd numbered registers $b_0, b_2, b_4, \ldots$ comprises one latch, and each of the even numbered registers $b_1, b_3, b_5, \ldots$ comprises two latches.

The m logic gates $G_0$ to $G_{m-1}$ perform a logic AND operation on the first input value a of each bit of the first shift register 11 and the second input value b output from the second shift register 12, and transfers the result to the output register 12. The m-bit output register 13 comprises m registers $Z_0$ to $Z_{m-1}$. The output value of each logic gate $G_0$ to $G_{m-1}$ is added to the value of each bit of the registers $Z_0$ to $Z_{m-1}$ in each adder 19. The generated multiplication result is stored in each of the registers $Z_0$ to $Z_{m-1}$. After performing m shift operations on the first input value a and the second input value b, the remaining values of the registers $Z_0$ to $Z_{m-1}$ become the values of the final multiplication result.

In FIG. 4, the m registers $a_0$ to $a_{m-1}$ and the m registers $b_0$ to $b_{m-1}$ are the registers for storing input values of the multiplier, and the m registers $z_0$ to $z_{m-1}$ are the registers for storing the multiplication results. In addition, the m bits $p_0$ to $p_{m-1}$ indicate the coefficients of the irreducible polynomial. Each of the coefficients of the irreducible polynomial implies a feedback. For example, if a coefficient value $p_2$ is 1, a feedback occurs and the value of register a1 is added to the value of a feedback register $a_{m-1}$. The adder 18 is implemented with, for example, XOR gates. In a configurable multiplier structure, the coefficient p of the irreducible polynomial is stored in a register and thus it can be used in various polynomial types. However, in the embodiment of the present invention, the coefficient p of the irreducible polynomial is considered to be hard-wired.

Figure 5:
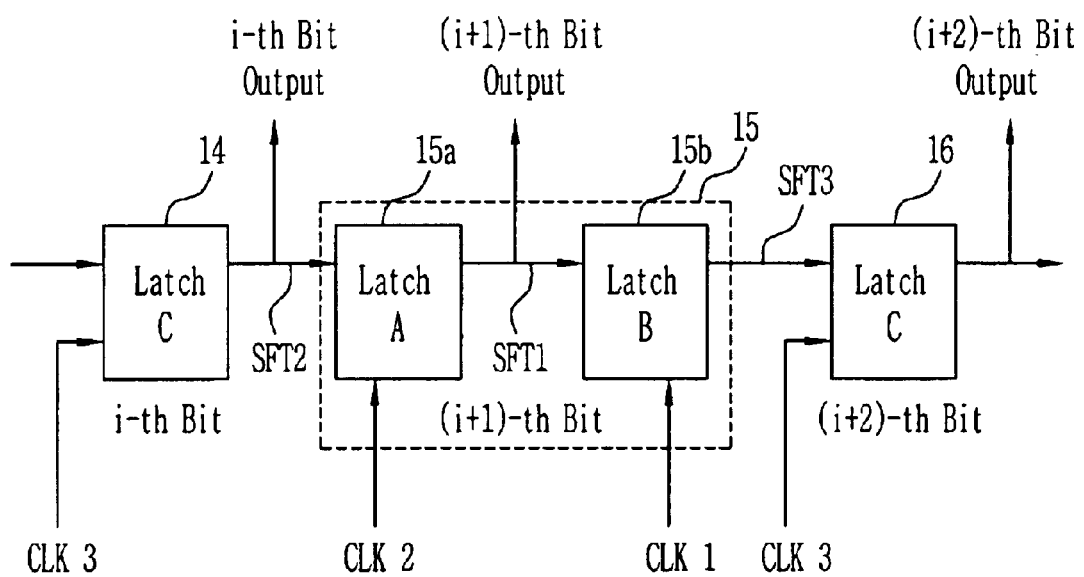
FIG. 5 is a view illustrating a structure of a shift register of FIG. 4.

FIG. 5 is a view illustrating a structure of the first shift register 11 and the second shift register 12 for storing the first input value a and the second input value b, respectively. The registers $a_0$ to $a_{m-1}$ of the first shift register 11 and the registers $b_0$ to $b_{m-1}$ of the second register 12 are constructed in the same way that the odd numbered registers comprise one latch and the even numbered registers comprise two latches.

For example, the odd numbered i-th register 14 comprises a latch for receiving data from (i−1)-th register (not shown) in accordance with the third clock CLK 3. The even numbered (i+1)-th register 15 comprises the first latch 15a for receiving data from i-th register 14 in accordance with the second clock CLK 2 and the second latch 15b for receiving data from the first latch 15a in accordance with the first clock CLK 1. In the same way, the odd numbered, (i+2)-th register 16 comprises a latch for receiving data from the (i+1)-th register 15 in accordance with the third clock CLK 3.

Figure 6:
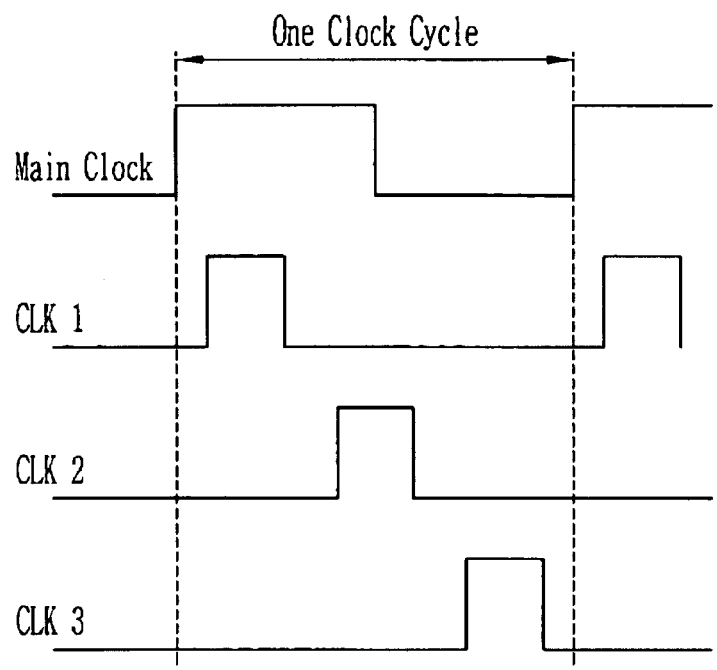
FIG. 6 is a timing diagram of a clock used for operation of the shift register of FIG. 4.

The first to third clocks CLK 1 to CLK 3, as shown in FIG. 6, are sequentially generated during the one cycle of the main clock, and the shift register transfers 1 bit of data to right through following steps.

The data stored in the first latch 15a of the even numbered register 15 is transferred to the second latch 15b in accordance with the first clock CLK 1 (Step SFT1). The data stored in the latch of the odd numbered register 14 is transferred to the first latch 15a of the even numbered register 15 in accordance with the second clock CLK 2 (Step SFT2). The data stored in the second latch 15b of the even numbered register 15 is transferred to the odd numbered register 16 in accordance with the third clock CLK 3 (Step SFT3).

Figure 7:
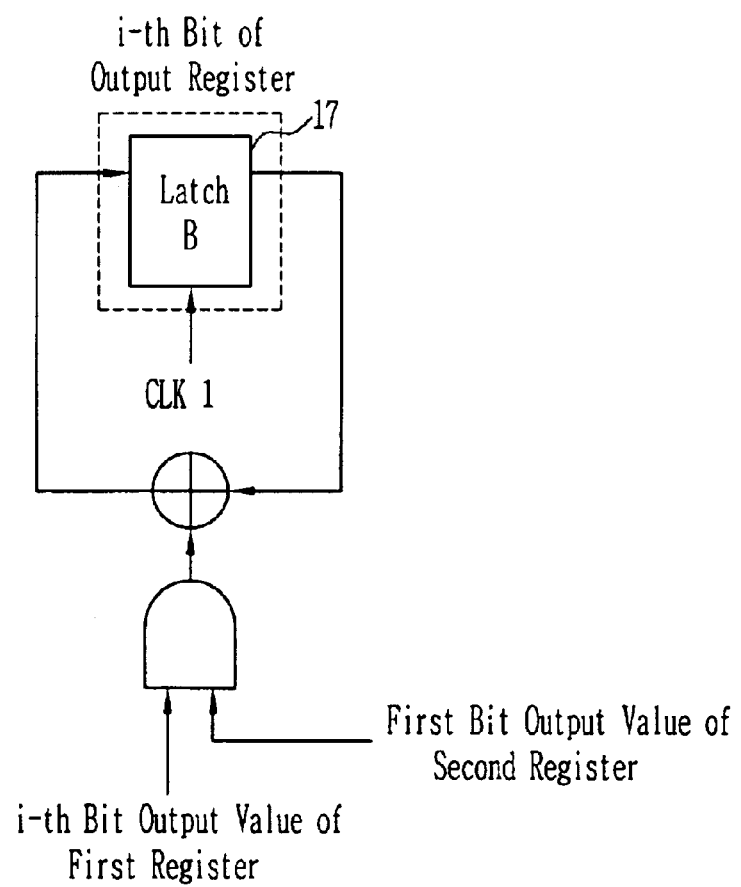
FIG. 7 is a view illustrating a structure of an output register of FIG. 4.

On the other hand, the m registers $Z_0$ to $Z_{m-1}$ of the output register 13 comprise one latch 17 as shown in FIG. 7. Each latch 17 receives the input value in accordance with the first clock CLK 1.

Figure 1:
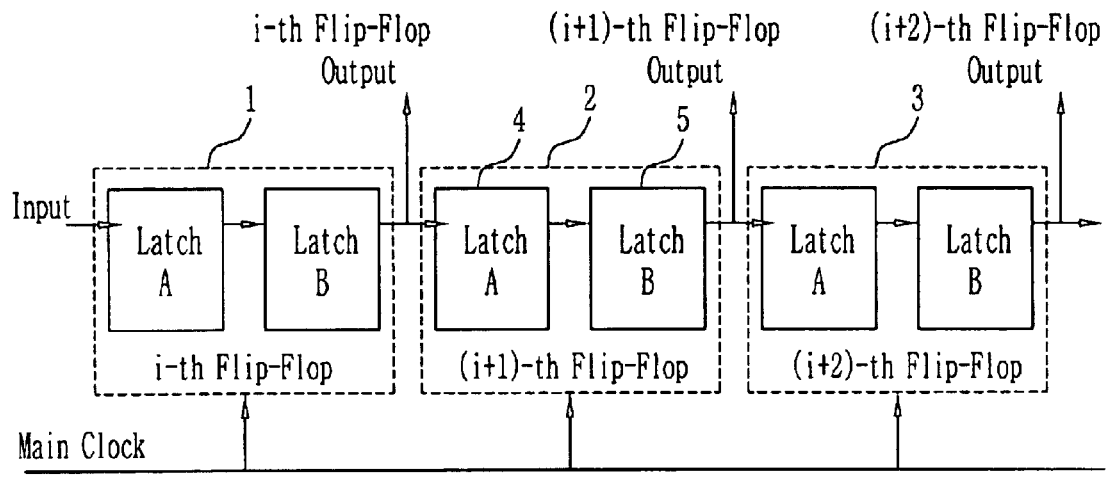
FIG. 1 is a view illustrating a structure of a shift register of a conventional finite field multiplier.
Figure 2:
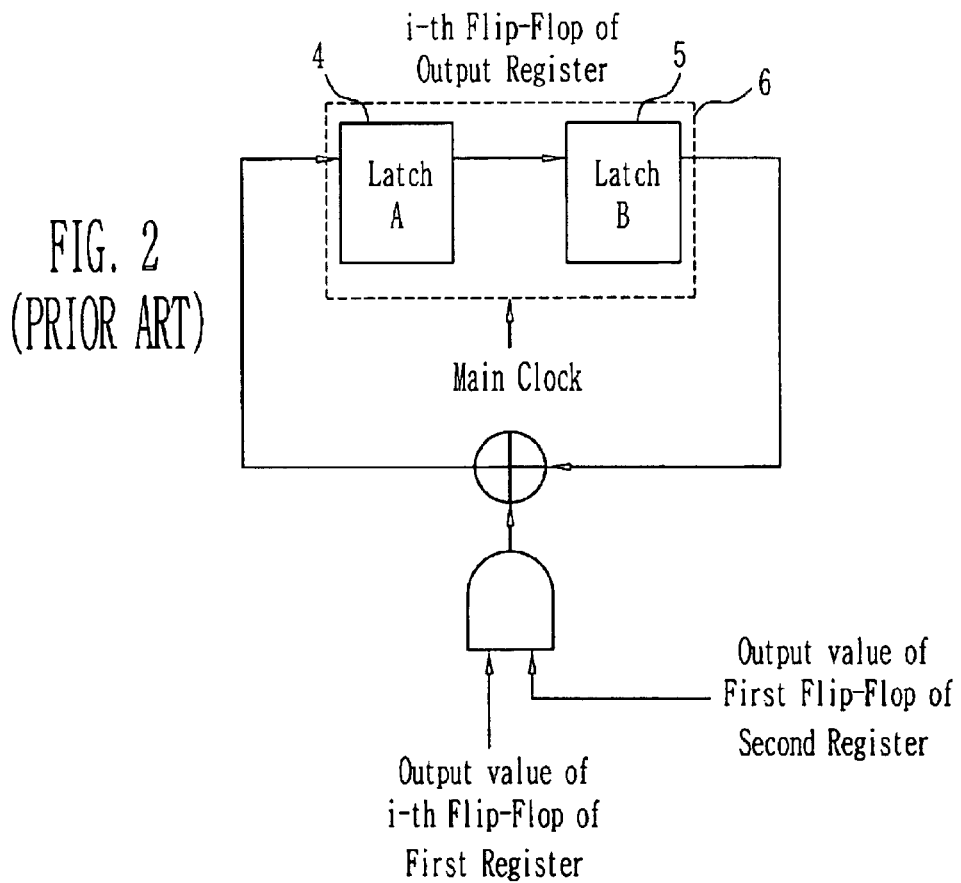
FIG. 2 is a view illustrating a structure of an output register of a conventional finite field multiplier.
Figure 3:
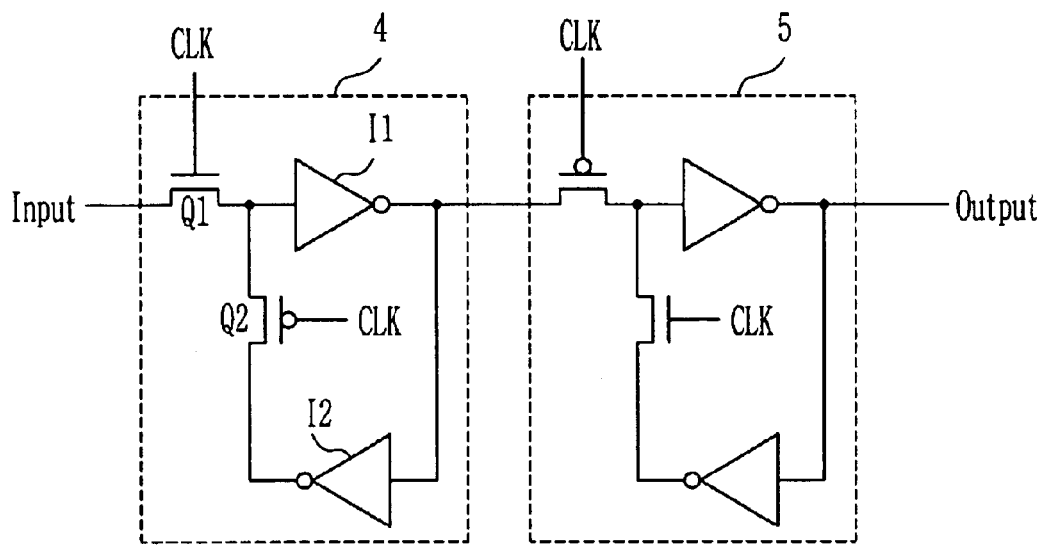
FIG. 3 is a detailed circuit diagram illustrating the flip-flops of FIGS. 1 and 2.

Conventionally, the output register, as shown in FIG. 2, comprises flip-flops 6 which are constructed with two latches 4 and 5 and stores data at the clock edge. However, in the present invention, as shown in FIG. 7, the output register is constructed with a single latch 17 utilizing clock levels, and the first clock CLK 1 is used. At the third clock CLK 3, the first shift register 11 and the second shift register 12 complete 1-bit shift operations. Therefore, when the first clock CLK 1 of the next cycle starts, addition can be performed on the values of the output register 13 and the output of the logic AND gate in a stable state at the first clock CLK 1 since the output of the logic AND gate is in a stable state, as shown in FIG. 4.

With the conventional method utilizing flip-flops, an m-bit finite field multiplier requires a total of 6×m latches. However, with the present invention utilizing the only latches, a finite field multiplier with a LFSR structure requires 4×m latches. In conclusion, a finite field multiplier with a LFSR structure according to the present invention can reduce 30% or more of the area and power consumption in comparison to that according to the conventional method.

As described above, the present invention can achieve the following results by constructing the registers with the only latches and controlling clock and data shifting sequence.

Firstly, in the multiplication circuit necessary for a finite field multiplication with a high order polynomial, power consumption can be minimized and the circuit can be implemented in small area.

Secondly, in an encryption processor based on an elliptic curve cryptography algorithm, the present invention can be effectively applied to the encryption device a utilizing public-key or an error correction coding device.

Thirdly, a multiplier which plays the essential role on an encryption processor circuit in an electronic card such as a smart card can be easily implemented.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A finite field multiplier comprising:
    a first shift register for shifting first input value of m bits to right by one bit in accordance with first to third clocks;
    a second shift register for shifting second input value of m bits to right by one bit in accordance with the first to third clocks; and
    logic gates for performing a logic AND operation on the first input value and the second input value for each bit; and
    a m-bit register for generating a multiplication result by adding an output value of each of the logic gates to a value of each bit and for storing the multiplication result.

2. A finite field multiplier according to claim 1, wherein the first shift register comprises a plurality of registers for storing each of value of the first input value and for shifting the stored value in accordance with the first to third clocks, and a plurality of adders connected to each of the registers for adding feedback output values of the registers to output values of the previous registers in accordance with coefficients of an irreducible polynomial,
    wherein odd numbered one of the registers comprises one latch, and
    wherein even numbered one of the registers comprises first and second latches.

3. A finite field multiplier according to claim 2, wherein the stored value of the register shifts through a step that data stored in the first latch of the even numbered register is transferred to the second latch in accordance with the first clock, a step that data stored in the latch of the odd numbered register is transferred to the first latch of the even numbered register in accordance with the second clock, and a step that data stored in the second latch of the even numbered register is transferred to the odd numbered register in accordance with the third clock.

4. A finite field multiplier according to claim 1, wherein the second shift register comprises a plurality of registers for storing each bit value of the second input value and for shifting the stored value in accordance with the first to third clocks, the odd numbered the register comprises one latch, and wherein even numbered of the registers comprises first and second latches.

5. A finite field multiplier according to claim 4, wherein the stored value of the register is shifted through a step that data stored in the first latch of the even numbered register is transferred to the second latch in accordance with the first clock, a step that data stored in the latch of the odd numbered register is transferred to the first latch of the even numbered register in accordance with the second clock, and a step that data stored in the second latch of the even numbered register is transferred to the odd numbered register in accordance with the third clock.

6. A finite field multiplier according to claim 1, wherein the first to third clocks are sequentially generated during one cycle.

7. A finite field multiplier according to claim 1, wherein each of the m-bit register comprises latches.

8. A finite field multiplier according to claim 7, wherein each of the latches receives an input value in accordance with the first clock.

* * * * *